United States Patent [19]
Bailey

[11] 4,003,017
[45] *Jan. 11, 1977

[54] CONTINUOUS BIT POSITIONING SYSTEM

[75] Inventor: John R. Bailey, Tulsa, Okla.

[73] Assignee: Senturion Sciences, Inc., Tulsa, Okla.

[22] Filed: June 3, 1974

[*] Notice: The portion of the term of this patent subsequent to June 18, 1991 has been disclaimed.

[21] Appl. No.: 475,791

Related U.S. Application Data

[63] Continuation-in-part of Ser. No. 371,142, June 18, 1973, Pat. No. 3,817,345.

[52] U.S. Cl. .................. 340/15.5 BH; 175/45; 340/18 NC; 340/18 DC; 340/15.5 MC
[51] Int. Cl.² .................. G01V 1/00; E21B 47/02
[58] Field of Search .......... 181/102, 106, 120, 116, 181/118; 340/18 NC, 18 DC, 15.5 MC, 15.5 BH; 175/1, 40, 45; 73/151; 166/308

[56] References Cited
UNITED STATES PATENTS

| | | | |
|---|---|---|---|
| 2,062,151 | 11/1936 | Weatherby | 340/15.5 BH |
| 2,898,084 | 8/1959 | Eckel et al. | 175/1 |
| 2,933,144 | 4/1960 | Scott et al. | 340/15.5 MC |
| 3,430,193 | 2/1969 | Lindsey et al. | 340/15.5 SC |
| 3,817,345 | 6/1974 | Bailey | 340/15.5 MC |
| 3,845,837 | 11/1974 | McEvers, Jr. et al. | 181/106 |

Primary Examiner—Maynard R. Wilbur
Assistant Examiner—S. C. Buczinski
Attorney, Agent, or Firm—Head, Johnson & Chafin

[57] ABSTRACT

A method for determining the precise position of the drill bit, in three dimensions, in the earth during a drilling operation, with a minimum of effort and interruption to the drilling process. It provides placing a motion sensor on the drilling apparatus and a plurality of vibration sensors or geophones, positioned in a two-dimension array on the surface of the earth, above the expected position of the drill bit. To make a measurement from which can be determined the position of the bit, the drill stem is raised a selected distance and suddenly released, so that it will fall in the borehole, and the bit will strike the bottom of the hole. This impact will cause an elastic wave to be generated at the bottom of the borehole. The elastic wave will be transmitted through the earth and will be detected by the geophones. The sensor provides information from which can be determined the time when the bit strikes the bottom of the drill hole. This determines the initiation time of the elastic wave. The arrival times at the geophones of the elastic wave can be measured and the position at which the elastic wave originated can be determined. Alternative embodiments involve the use of jars in the drill string which generate secondary elastic waves. Also when the pipe is lifted and the bit is lifted off bottom, an expansion elastic wave will be initiated.

19 Claims, 6 Drawing Figures

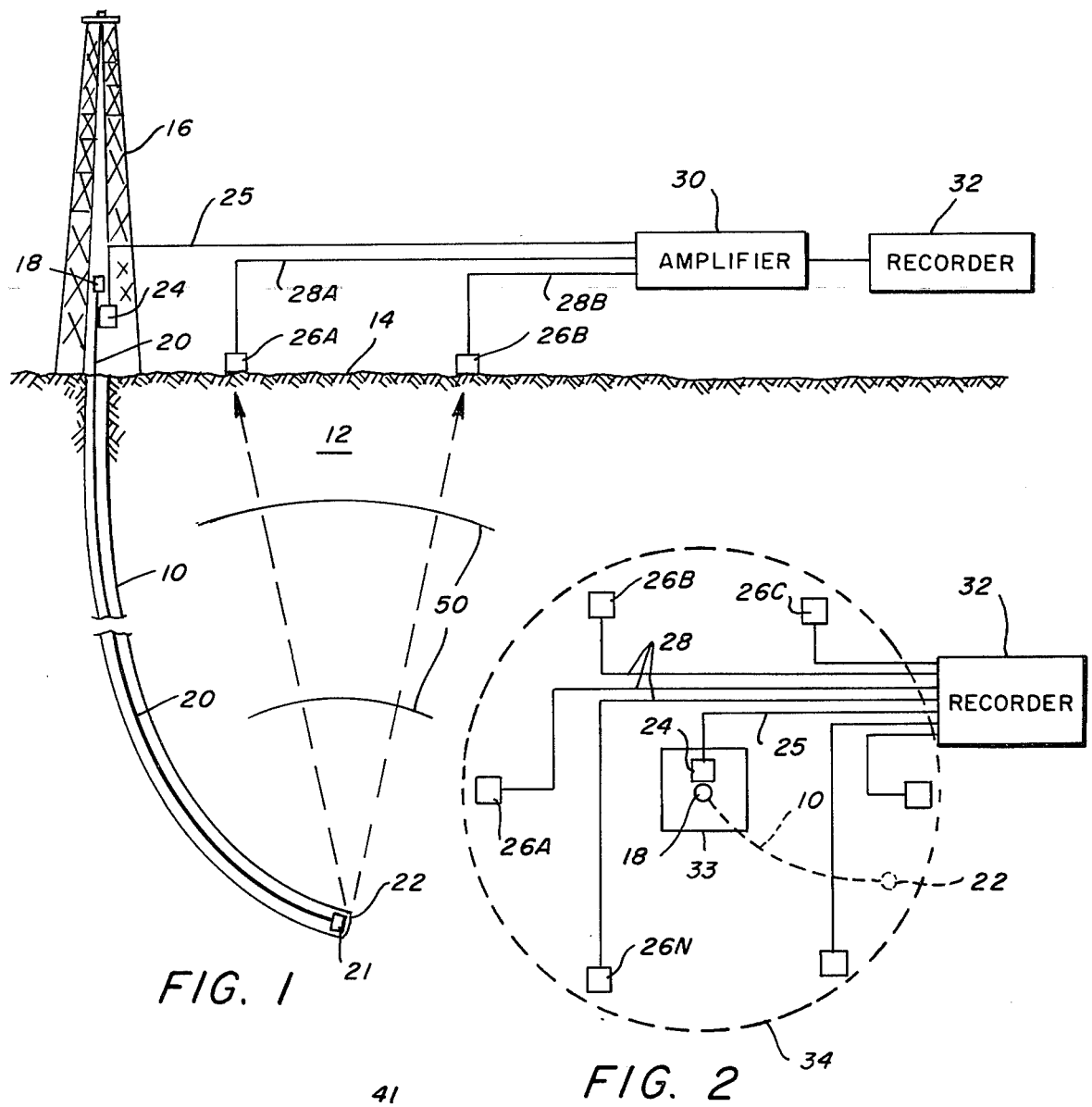
FIG. 1
FIG. 2
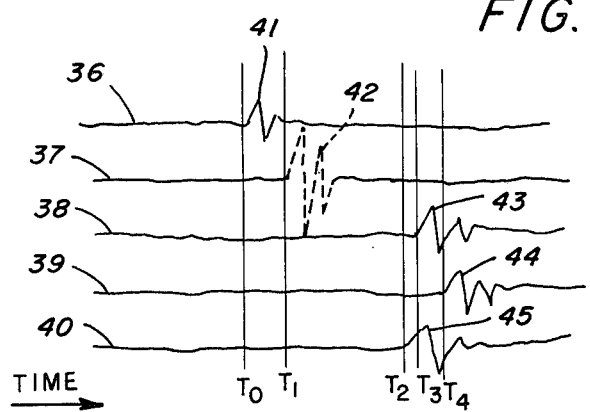
FIG. 3

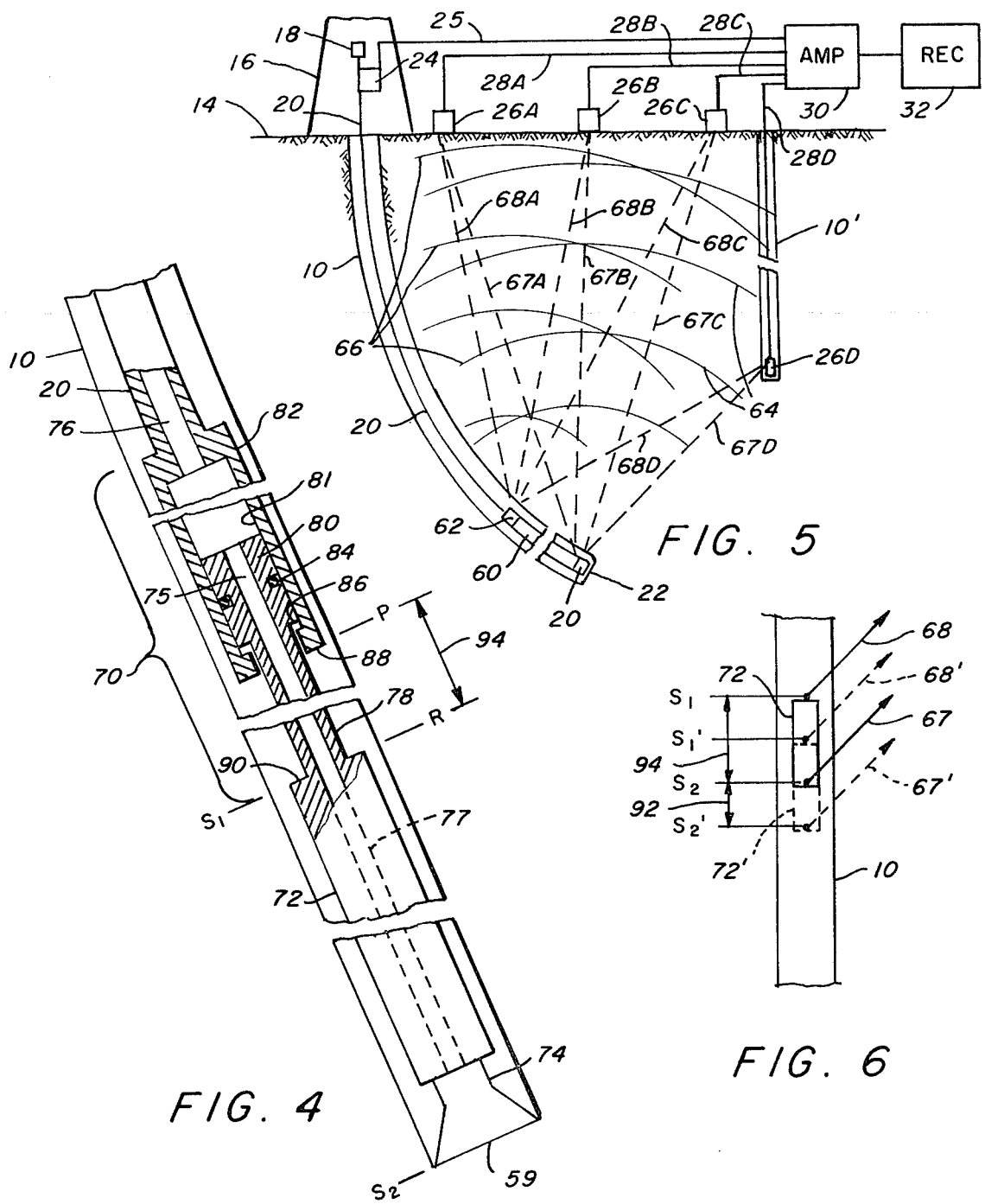

CONTINUOUS BIT POSITIONING SYSTEM

CROSS REFERENCES TO RELATED APPLICATIONS

This application is related to and is a continuation-in-part of my copending application Ser. No. 371,142 filed June 18, 1973, now U.S. Pat. No. 3,817,345 entitled "CONTINUOUS BIT POSITIONING SYSTEM". It is also related to my U.S. Pat. No. 3,739,871, entitled "MAPPING OF EARTH FRACTURE INDUCED BY HYDRAFRACTURING," which is hereby entered into this application by reference.

BACKGROUND OF THE INVENTION

This invention is in the field of elastic wave generation, transmission and detection in the earth. More particulary, it is concerned with determining the position in the earth of the drill bit during a drilling operation in a deep borehole. Still more particularly it concerns determination of the velocity of elastic waves in the earth.

In the prior art, various means have been devised for determining the position of the borehole in North-South, East-West coordinates, at selected depths during a drilling operation. This has been done by using survey instruments specially designed for introduction into the borehole and sometimes introduced through the drill pipe, which by their internal mechanism make a record of the slope (or angle with the vertical) of the borehole at each of a plurality of selected depths and a measure, in relation to the magnetic compass, of the azimuth of the slope of the borehole. Knowing the direction of slope and magnitude of slope, at each of a plurality of selected known depths and assuming that the borehole is straight in between the survey points at which measurements are made, the profile of the hole in three dimensions can be plotted.

The disadvantage of this particular system is that it requires a stoppage of the drilling process so that the drill pipe can be broken and the survey instrument inserted on a wire line into the drill pipe. Since the cost of operation of the drill rig runs into many hundreds of dollars a day, time lost from the drilling operation, to make these measurements, is extremely expensive. There is understandable reluctance on the part of drillers to make these necessary measurements, so that at some future time, when this knowledge is needed, it will not be available and cannot be easily obtained.

SUMMARY OF THE INVENTION

It is a primary object of this invention to provide a simple and inexpensive means for determining, at any selected time, a measurement indicative of the position of the bottom of the borehole during a drilling operation.

It is a further object of this invention to provide a method of determining the position of the bottom of the borehole without interrupting the drilling operation.

It is a further object of this invention to provide a method of determining the velocity of propagation of elastic waves in the earth in the vicinity of the drill bit.

These and other objects are realized and the limitations of the prior art are overcome in this invention by attaching a sensor to the drilling mechanism such as at the mud swivel, for example, and providing a plurality of geophones, or other elastic wave earth motion detectors, placed on the surface of the earth. The drill pipe is lifted off bottom a few feet and is suddenly released. The time of the start of the fall of the drill pipe at the surface is indicated by the sensor. At some time later, which can be obtained by calculation, knowing the velocity of elastic waves in the drill pipe and the length of the drill pipe, there can be determined the time at which an elastic wave will be initited in the earth, at the bottom of the borehole, by the drill bit striking that bottom face. Sometime later, the elastic wave will be received at the surface of the earth and a record made of the arrival times, at each of the geophones. Knowing the time of release of the drill pipe, and the arrival times of the elastic wave, it can be determined from these data, the position of the drill bit at the time the elastic wave was initiated.

Further embodiments utilize jars in the drill string above the drill collars. Thus, as the drill stem (including bit, drill collars, jars and drill pipe) falls the bit will strike bottom generating a first elastic wave. A short time later the jars will close and the drill pipe will in effect strike the drive collars, causing a second elastic wave which will travel down the drill collar through the bit and into the earth.

Similarly, when the stem is standing on bottom and the pipe is lifted, the bit will be lifted off bottom. This will cause an expansion or rarefaction wave to be generated at the bottom of the borehole.

BRIEF DESCRIPTION OF THE DRAWINGS

These and other objects of this invention and a better understanding of the principles and details of the invention will be evident from the following description taken in conjunction with the appended drawings in which:

FIG. 1 represents a cross section of the earth and indicates the method of operation of the invention.

FIG. 2 indicates a suggested surface array of detectors, or sensors, particularly when used at an offshore drilling platform.

FIG. 3 indicates time records of the various signals generated and recorded.

FIG. 4 illustrates an enlarged view of the bottom of FIG. 1 showing the drill bit, drill collar and drilling jars on the bottom end of the drill pipe.

FIG. 5 illustrates a variation of FIG. 1 showing two sources of elastic waves at the bit and at the jars.

FIG. 6 shows more detail of the two sources, at two different depths in the hole.

DESCRIPTION OF THE PREFERRED EMBODIMENT

Referring now to FIG. 1 there is shown a cross section of the earth 12 with the earth's surface 14. There is a well 18 drilled in the earth. The borehole 10 is indicated as being curved and, therefore, the bottom of the borehole 22 is not directly below the well 18. There is no easy way of determining the precise position, in the earth, of the bottom of the borehole 22.

There is shown a conventional rotary drilling derrick 16 and a sensor 24 which is mounted on the side of the mud swivel, for example. The sensor can be an acceleration, velocity or displacement sensor. The actual drilling apparatus including the hoist cables, etc. are not shown, but are conventional and well known in the art. The drill pipe 20 is rotated by the rotary table (not shown) at the surface, so that the bit 21 at the bottom of the borehole will cut the rock at point 22. The borehole is normally filled with drilling mud, which circulates down the drill pipe and up through the annulus, to carry the rock cuttings to the surface.

It is important to know the exact position in the earth of the point 22, because during the drilling operation it is important to know the curvature of the borehole and of the drill pipe so as to prevent damage to the drill pipe due to fatigue failure due to rotation and bending and so on. This information is important also in setting casing and in determining the exact point from which oil is being produced.

The normal method of determining the position of the drill hole is to lower a survey instrument into the drill pipe. This requires breaking the drill pipe at the surface and stopping the drilling operation. The survey instrument is lowered into the drill pipe at a plurality of spaced points, in depth and at each point the slope and azimuth of slope of the drill pipe is determined. Commercial services are available to do this. From these data it is possible to plot the approximate position of the borehole in space. The cost of interrupting the drilling process to take these data and the inaccuracy of the data leave much to be desired in the use of this method.

In accordance with this invention, the operation is to lay out a group of sensors or geophones 26A, 26B, etc. on the surface of the earth 14 and to connect them to amplifiers 30 through leads 28A, 28B, etc. The sensor 24 is connected through lead 25 to the amplifier 30. All amplified signals go to a recorder 32. The recorder will show a record corresponding generally to that shown in FIG. 3, which will be described in detail later. The system of detecting elastic waves at the surface of the earth and determining from the known time of initiation of an elastic wave and the arrival times at the surface the precise position of the point or origin of the elastic wave, has been thoroughly described in my U.S. Pat. No. 3,739,871. In that patent the source of the elastic wave was the fracturing of the rock at the point of application of a high pressure fluid to the rock.

In this application, the elastic wave is initiated by the impact of the drill bit against the bottom of the borehole. This is accomplished by lifting the drill pipe and letting it fall suddenly to strike the bottom.

One important datum that is needed is the time at which the drill bit strikes the bottom. This can be determined by recording the instant in time at which the drill pipe is released at the surface by suddenly releasing the support cables in the drilling tower 16. The drill pipe is normally in tension because of the weight at each point of the pipe below that point. Therefore, if the top end of the pipe is lowered suddenly, the tension in that portion of the pipe will be released and that release in tension will travel down the pipe 20 as an elastic wave at a rate corresponding to the velocity of transmission of elastic waves in the pipe. This can be determined by calculation or by experiment, as is well known in the art. Recording the time at which the top end of the drill pipe is released and knowing the length of the drill pipe, the time of initiation of the elastic wave by the bit can be determined.

This is indicated in FIG. 3, where trace 36 shows an event 41 at time T0, which represents the instant of release of the drill pipe at the surface. The horizontal coordinate is time. At some time later, determined by the interval between T0 and T1, the bottom of the drill pipe or the drill bit strikes the bottom of the borehole and an event shown at 42 (in dashed outline) indicates the elastic wave generated in the earth at the bottom of the borehole. This event 42 is now the source of the elastic wave which progresses in the earth as a spherical wave, outwardly from the point 22, as shown by the circles 50. As this elastic wave reaches the surface it will contact and be detected by the geophones 26A and 26B etc. The signals generated by the geophones will be recorded as events 43, 44, 45, etc. as shown on traces 38, 39 and 40. It will be clear that event 45, since it arrives before the other events, will indicate that its geophone will be the closest to the point 22. From its position and the positions of the other sensor and the arrival times T2, T3 and T4, etc. the position of the point 22 can be determined.

The manner in which the arrival times and the calculated instant of generation of the elastic waves can be processed to provide the location of the source of elastic waves is thoroughly described in my U.S. Pat. No. 3,739,871. Reference is made to that patent for full details as to the processing of these data. By calculating backward from the times of arrival at each of the sensors and drawing spherical surfaces corresponding to the travel times T2,–T1, T3–T1, etc. the point at which all of the spherical surfaces intersect in space will be the location of the source of the spherical wave that was detected by the sensors. It is necessary to have a plurality of sensors arranged in a two dimensional array on the earth's surface. Theoretically three sensors will be sufficient, although for practical purposes four or more are desired. This is because noise disturbances might mask one or more of the wave arrivals and therefore vitiate the use of those sensors in the determination. As a practical operation five to ten or more spaced geophones would be desired.

As a practical operation this method would find great use in the offshore areas where drilling is done from a drilling platform such as 33. A plurality of detectors 26A, 26B, 26C...26N would be arrayed as shown in FIG. 2 over an area, larger in diameter than the expected displacement of the bottom of the borehole 22 from the well 18. Of course, in many drilling situations, wells are intentionally displaced horizontally, so that a large area of subsurface drainage can be taken care of by wells whose well heads are within a small area, generally the size of the platform.

On a dry land surface, any type of vibration detector or geophone, such as those customarily used in the seismic exploration systems, can, of course, be used. In an offshore water covered area it will probably be desirable to place the geophones on the sea floor and connect them by cable to or by radio telemetry to amplifiers and recorders on the drilling platform. It will be clear also that one or more geophones can be placed below the surface, or below the sea floor in shallow or deep boreholes. This is indicated in FIG. 5 showing geophone 26D in deep borehole 10' with leads 28D leading to amplifier 30.

In the past, many people have tried to record the noises made while the well is being drilled as an indication of the point at which the drilling operation is actually taking place. These have always been unsatisfactory, because of the large amount of noise generated by the rotation of the drill pipe along the whole length of the borehole, as well as the vibration set up at the surface of the earth, due to the engines, mud pumps and other moving apparatus at the drill site. The improvement of this invention has been the use of a particular source of energy for initiating the elastic wave, and that is the impact of the drill pipe on the bottom of the hole. During the short time while the drill pipe is falling the drilling operation must be stopped, so that there will be some reduction of general background noise. However, even so there will be considerable noise from the surface machinery and therefore a large grouping of detectors is desirable in order to obtain an improved indication of the point of origin of the elastic, wave and therefore the position of the borehole.

In the foregoing I have described the operation of dropping the drill pipe and impacting the drill bit on the bottom of the well bore to generate an elastic wave in the earth surrounding the well, which elastic wave is detected by a plurality of geophones at or near the surface, so that the times of arrival of the elastic wave generated by the bit impact can be determined. The time of initiation of the bit on the bottom can be determined by determining the time at which the suspended drill pipe is released so that it may fall and determining the time of travel of the elastic wave in the pipe due to the release of tension in the pipe down to the bit and adding thereto the time of fall of the bit and pipe from its elevated position until it impacts the rock at the bottom of the borehole.

It will be clear also that the time of initiation of the elastic compressional wave from the bit impact can be determined by using an appropriate sensor on the drill pipe at the surface and detecting the compressional waves that will be set up in the drill pipe itself due to the impacting of the bit onto the well bottom. This elastic wave will travel at a known or determinable velocity in the steel pipe and, knowing the length of the pipe, it is possible to determine the travel time and by detecting the arrival at the sensor at the surface the initiation time of the elastic wave at the bit can be precisely determined.

It is possible also to detect the compressional wave set up at the bit, which will pass up through the water or mud column inside the drill pipe at a different and lower velocity than the velocity of the elastic wave in the pipe. This elastic wave in the water or mud inside the pipe can be detected by appropriate pressure transducers, as is well known in the art. Also, there will be an elastic wave propagating upwardly through the water or mud in the annulus of the well, which likewise can be detected at the surface by appropriate sensors, which are well known in the art.

When the bit is resting on the well bottom it will exert a large compressive force on the earth due to the weight of the drill collars and a part of the drill pipe. When the pipe, drill collars and bit are suddenly lifted off of the well bottom, there will be a relaxation or expansion of the rock, which will cause an outwardly moving dilatational spherical elastic wave to be generated in the earth, which can be detected at the surface by the geophones, as previously described.

Therefore, this invention which involves the lifting and dropping of the drill pipe, drill collar and bit can be operated in either of two modes, that is, by raising the bit off bottom a selected distance and then suddenly releasing the pipe so that the falling pipe and bit will impact the rock at the well bottom or conversely, by suddenly lifting the pipe and the drill collars and the bit so that a rarefaction or dilational or expansion wave will be generated.

While both of these two modes can be used, it is possible that one of them, that is the impacting mode, will give a larger impulse and elastic wave than will the liftoff mode. However, there may be additional seismic noise due to the bouncing and rubbing of the pipe as it falls which may interfere with the determination of the time of impact.

This invention anticipates also that the method may be applied with or without jars in the drill stem. Jars are commonly used on a drill stem and are placed at or near the junction of the drill pipe and the drill collars, so that if for any reason the drill collars, because of their large diameter and close fit in the borehole, become wedged in the hole because of mud or cuttings or other reasons, then by lifting and dropping the pipe, severe jarring forces can be applied to the drill collars, to cause them to be moved and therefore freed so that they can be lifted out of the borehole. Since jars are well known in the art they need not be fully described except to illustrate that there is a mechanism by which the drill pipe can move through a selected distance, without moving the drill collars and bit. Whenever the drill pipe attempts to move through a greater range of distance, it will either strike the drill collar on its downward movement, or strike a shoulder installed in the jars so that an upward force will be exerted on the drill collars.

The term drill jars in the absence of a better name, will be used to indicate any apparatus that is provided to allow the relative motion of drill pipe and bit over a selected small distance. This can be accomplished by means of an apparatus shown in FIG. 4, for example, but is not limited to this design.

In FIG. 4 is shown a drill bore 10 with hole bottom 59. The drill bit 74 is attached to the bottom end of the drill collar or collars 72, which will be referred to, for convenience, in the plural, even though it may consist of only a single collar. The drill collar 72 is of large diameter and considerable length, possibly up to as much as 200 feet in length and very heavy, in order to provide a great weight with which to press the drill bits against the rock bottom 59 while the drilling proceeds. There is an upward tubular extension 78 of the drill collar 72 and a shoulder 90 at the junction of the extension 78 and the drill collar. This extension is of selected length and has an enlarged portion 80 at the top which is cylindrical in shape and which slides within a corresponding bored opening on the inside of a tubular extension 82 of the drill pipe 20. The tubular extension 82 and the extension 78 comprise the jars and would be coupled by threaded portions, not shown, at the top to the pipe and at the bottom to the drill collars. In other words, the extensions 78 and 82 need not be solid extensions but can be attached by means of appropriate threaded couplings. The enlarged portion 80 slides within the inner bore 81 of the top portion 82 of the jars, indicated generally by the numeral 70. There is a sealing means 84 so that as the outer portion 82 slides with respect to the inner portion 80, mud which flows down through the inner opening 76 through the opening 75 and into the opening 77 to the bit, will not pass through the junction between the parts 80 and 82.

The bottom portion of the cylindrical tubular part 82 has an inner flange 88 such that on the upward movement of 82 the flange 88 will contact the shoulder 86 and provide a strong upwardly directed impulsive force, so as to jar the drill collar 72. On the other hand as the drill pipe is lowered and the part 82 moves downward, then the portion 88 will strike the shoulder 90 and cause a downwardly directed impulsive force on the drill collar.

The letter P is indicated to show the lower face of the part 82 and the letter R is used to indicate the shoulder 90 of the drill collar. As the pipe is lowered, the surface P will contact the surface R and will provide, as a hammer on an anvil, a large compressional force which will be transmitted downwardly through the drill collar and through the bit against the surface 59 and will radiate as an elastic wave, eventually reaching the geophones at the surface. Thus, if the pipe is raised high enough so that the part 88 impacts on the shoulder 86 and lifts the drill collars and bit off bottom, then when the pipe is released as discussed in connection with FIG. 1, the drill bit hanging from the jars will first impact the surface 59 with a first elastic wave, indicated generally by the numeral 64 (FIG. 5) as an expanding spherical wave. A short time later, after the bit is on bottom and the surface P being lowered with the drill pipe strikes the surface R, a second impulsive impressional valve 66 will be generated at R and will radiate into the earth and to the geophones from the point R. This wave will also travel down the drill collar and bit and will pass into the earth through the bottom 59 and will travel to the surface like the first wave 64. Thus, the combination of FIGS. 4 and 5 when compared with FIG. 1 provide a similar impulsive force on the bottom 59 which generates one elastic wave and a short determinable time thereafter, the surface P impacts on the surface R and generates a second elastic wave 66 which at some later time is detected by the geophones 26A, 26B and 26C in FIG. 5.

There is a real advantage in having two timed sources in that the combination may be easier to detect on the records provided by the geophones 26 than would a single impulse alone. Thus, the double impulse can be of considerably greater value and, therefore, the use of the jars is an advantageous improvement.

There are a number of ways to describe what happens at the interfaces P and R and these will be described, for convenience in several ways as; the impacting of surface P on surface R, or the closing of the jars 70, or the impacting of the drill pipe, an extension of which is the surface P, onto the drill collar which is the surface R. One or more of these descriptive phrases may be used at different times and in the claims to describe the process of impacting P on R in order to generate an elastic wave.

It will be clear also that when the drill stem is resting with the bit 74 on the bottom 58 as is shown in FIG. 4 and P is close to R, then by lifting the pipe and correspondingly the portion 88, it will rise until it impacts on the collar 86 with the generation of a compressional wave which will radiate from the point P through the mud in the hole into the earth. The impulse will also travel down the drill collar to the bit and into the earth. This type of action will be described as the impacting of the opening jars, in contrast to the impacting of the closing jars, when the pipe is lowered. It is conceivable that the elastic wave generated on the lifting or opening of the jars will not be as great in intensity as will be the elastic wave generated on the closing of the jars. Also on the closing of the jars the drill bit will be on bottom and the drill collar or drill bit will provide an efficient mechanism for getting the compressional wave from the surface R into the earth at the bottom 59 of the borehole.

This application also includes by reference my issued U.S. Pat. No. 3,739,871, which illustrates a method of determining the point of initiation of an elastic wave in the earth, which is subsequently recorded on a plurality of geophones arranged in a two dimensional array on the surface of the earth, when the time of initiation is not known. As explained in that patent, the answer, namely, the position of the source of elastic waves, can be determined by making a successive number of iterations, or calculations by selecting a series of estimated values of the estimated time of initiation of the wave or the average velocity of propagation of elastic wave between the position of the bit and the surface. By selecting enough assumed velocities which would extend from a value less than to a value greater than the true average velocity in the earth, a value of average velocity will be determined which is the true average velocity. As explained in U.S. Pat. No. 3,739,871 all of the signals reaching the geophones can be carried backwards in time in the form of expanding spherical surfaces and if the velocity is correct, all of the spherical surfaces will intersect at a common point, which will then be the true position of the source of the elastic wave.

While in this invention I show a number of ways of determining the instant of initiation of the elastic wave at the bottom of the hole, there may be times when this signal is not readily available possibly because of the presence of noise or other disturbance on the drill rig. In such a case, the method which has just been described can be used without the sensor signal at the surface of the well using only the geophone signals to determine the position of the source of the signals.

In such a case it is possible also to use this method including the calculation just outlined to determine the position of the bottom of a borehole which is being drilled by the cable tool method. This method involves raising a weighted drill bit by means of a cable and suddenly releasing the cable, causing the bit to impact on the bottom and to chip off a portion on the rock. This operation is repeated many times to deepen the hole. Each of these droppings will cause an elastic wave to be generated in the earth which can be recorded on the geophones and by the process just outlined, the point of impact can be determined.

It has been discussed above how the sensor on the drilling apparatus or drill pipe at the surface or in the mud column inside the pipe, or in the mud column outside the pipe can be used to detect the upward movement of an elastic wave either in the pipe or in the mud in the pipe or in the mud outside the pipe, to determine the time or instant of initiation of the elastic wave. Similarly, by lifting the pipe and getting a sudden liftoff of the bit and drill collars, it is possible to get an expanding elastic wave generated in the earth. This initiation can also be determined by receiving at each of the surface sensors a corresponding expansion elastic wave either in the pipe or in one or other of the two mud columns.

It is possible also by the use of a continuously recording weight indicator at the surface and a device for continuously recording the position of the pipe at the surface to determine when the exact point of liftoff occurs. Consider the case where there is a continuous record of weight at the surface and position of the pipe at the surface, which would be called "weight" and "position" respectively. The bit and drill collars are resting on bottom. As the pipe is lifted the weight will increase as a function of time, as more and more pipe comes to be in tension. When all of the pipe is moving, then the jars as shown in FIG. 4 will start moving so that there will be no further increase in weight indicated. Then when the jar hits the upper stop and is wide open, the weight will start increasing again because the pull is being exerted on the drill collars and as the pipe continues to move upwardly there will be a continually increasing weight until the bit is lifted off bottom at which time the weight indication will again be constant.

The time at which the weight indication becomes constant would be an indication of the time at which liftoff occurs at the bit except for the travel time of the elastic wave which is transmitted from the bottom of the bit to the surface through the pipe indicating that the weight is now constant. So, subtracting from the time at which the weight becomes constant the travel time of an elastic wave in the drill pipe and collars, which can be determined from the known length of the pipe and collars, it is possible to determine the instant of liftoff.

However, as indicated above, a simpler method might be simply to record on the sensor the time of arrival of an elastic wave from the bit to the surface, which elastic wave would be an expansion wave which will be of opposite phase to a compressional wave, and can be detected by an appropriate sensor at the surface.

Referring to FIG. 5 and comparing it with FIG. 1 it will be clear that one or more of the geophones which are set up to detect the elastic waves 64 and 66 can be below the surface 14 of the earth and in fact may be installed in one or more deep holes such as 10' horizontally displaced from the borehole 10. Borehole 10' has a deep hole geophone 26D, such as is well known in the art. Geophone 26D is connected by appropriate conductor 28D, to an amplifier in the amplifier group 30 and so on. Thus, the geophones may be arranged in a three dimensional array around the exacted position of the source at elastic wave and a two dimensional array is not necessarily required. However, for a true positioning of the point of initiation of the elastic wave it is required to have a two dimensional array of geophones or other detectors in a plane substantially perpendicular to the ray paths such as 67 or 68 of FIG. 5.

Referring now to FIG. 6, there is shown in the borehole 10 the drill collars 72 in a first position and 72' shown by dashed line in a second position, which is lower by a distance 92. As shown in FIG. 4 an elastic wave can be generated at the point $S_1$, or at the drill bit $S_2$. If this process of determining the position of the drill bit is a continuous process during the drilling of the well such that the process is frequently repeated as the borehole is drilled to deeper and deeper positions, it should be possible to take readings at corresponding depths of boreholes of some selected number such as 5, 10 or 50 feet for example. If the times of arrival and the times of initiation are precisely determined, a differential time can be determined for the travel of the rays 68 and 67 from each of two positions 21, 32, so that the additional travel time for the deeper position such as 51', 52' will be due to the travel through an additional depth 92 of the drill hole. Therefore, the differential increase in time and the differential depth 92 will permit a calculation of the average velocity in that portion of the earth corresponding to the two depths of $S_2$ and $S_2'$. Such velocity information is valuable to the geologist and geophysicist and is an important part of the kind of information obtainable under this invention.

It is possible also if the two elastic waves 68 and 67 ar clearly delineated to determine a velocity over the depth interval 92 which represents the distance between the source $S_1$ and the source $S_2$, namely the length of the drill collars. The travel time difference to any single receptor at the surface is a function of the velocity of travel of elastic waves or seismic waves, in the earth over a distance corresponding to the dimension 94 in the boreholes. By making the change in depth 92 equal to 94, there should be a check on the velocity determined by the two methods just outlined.

To summarize this invention, methods are described for determining the position of a drill bit or the position of the bottom of a drilled hole by lifting the drill stem of and causing it to be freed to fall and impact the bit on the borehole bottom to generate an elastic wave, which is detected at the surface on appropriate geophones. Similarly, the same operation can be done by lifting the pipe suddenly, so that the drill bit is suddenly lifted off the bottom and detecting the resulting expansional elastic wave at the surface. Appropriate sensor means are provided for determining the instant at which the elastic wave is initiated in the earth. However, it is not necessary that this information be provided, since it is possible also be a series of calculations to determine the point of initiation of an elastic wave that is received on a plurality of geophones. The method by which the position can be determined without knowing the precise time of initiation of the elastic wave is fully described in U.S. Pat. No. 3,739,871, which is incorporated into this application by reference. It is therefore clear that this invention can be used also in a type of borehole drilling system which does not use the rotary method and does not have a rigid pipe system up to the surface, such as the cable tool type of drilling. In this apparatus a heavy drill collar and bit is suspended on a cable to the surface and the cable is periodically lifted and dropped permitting the drill bit to fall and strike the bottom. Each time it strikes it will chip off pieces of the rock which eventually will accumulate in the bottom and can be picked up by an appropriate bailing tool lowered from the surface. Since there is no rigid pipe connecting the drill bit to the surface the use of a sensor at the surface is impractical and the method described in my patent can be be used, by a series of calculations to determine the point of initiation of the impacting signal.

With rotary drilling apparatus the method can be practiced with jars in the drill stem. This provides an additional advantage since it will provide additional information and make a more precise determination of the position possible.

It is quite possible that the frequency content of the first elastic wave generated at the bit by the impact and the second elastic wave at the jars by the impact which travel down through the drill collar and the bit to the earth, will have a different frequency content. Thus the signals received at the geophones may be beneficially filtered in two different filters, one suited to the high frequency of the signal from the jars and the other suited to the lower frequency of the signal from the bit. It is therefore contemplated that signals will be filtered by two or more filters in order to enhance the signal at the expense of drilling noise.

It is clear also that the time difference between the two signals from the jars and from the bit will be displaced in time by a time interval equal to the transmission time of an elastic wave from the top of the drill collar to the bit and this time interval can be used as an additional criterion to distinguish these two impulses as being due to the selected elastic waves.

While I have shown wire connections between the sensor and geophones and the amplifiers and the recorders, in view of the large dimensions of the array of geophones it will often be convenient to use radio transmission of the geophone signals. This can be done in the form of analog or digital telemetry, as is well known in the art.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. The method of determining the position in the earth of the bottom of a borehole, during rotary drilling of said borehole, including a known length of drill pipe at least one drill collar, jars and bit, comprising:
   a. placing a plurality of sensors in the earth in a known geometric pattern above the expected position of the bottom of the borehole, said sensors adapted to detect and transduce the vibrations in the earth to corresponding electrical signals, and amplifying said transduced signals;
   b. lifting said drill pipe, drill collar, and jars a selected distance, and suddenly releasing the drill pipe, so that it falls in the borehole until the drill bit strikes the bottom of the well bore, whereby the impact of the drill bit on the bottom of the well bore will generate a first elastic wave in the earth, and the impact of the pipe on the jars will generate a second elastic wave in the earth;
   c. determining the time of release of said drill pipe;
   d. recording as a function of time said amplified transduced signals and determining the times of arrival of at least either said first or second elastic waves at said sensors; and
   e. from the known time of release of said drill pipe and the known length of drill pipe and the times of arrival of said at least either said first or second elastic waves at said sensors, determining the positiion of said bottom of the borehole.

2. The method as in claim 1 including the step of determining from the known time of release and the known length of drill pipe, the times of generation of both said first and said second elastic waves.

3. The method as in claim 1 in which said sensors are arrayed within a circle the center of which is at the well head, and the perimeter is outside the maximum expected radius of said bottom of said borehole.

4. The method as in claim 1 in which said sensors are on the surface of the earth.

5. The method as in claim 1 in which said sensors are on the interface between the earth's surface and an overlying body of water.

6. The method as in claim 1 including at least one subsurface sensor.

7. The method as in claim 6 in which said at least one sensor is in the second deep borehole displaced from said borehole.

8. The method of determining the position in the earth of the bottom of a borehole, during rotary drilling of said borehole, including a known length of drill pipe, at least one drill collar, jars and bit, comprising:
   a. placing a plurality of sensors in the earth in a known geometric pattern above the expected position of the bottom of the borehole, said sensors adapted to detect and transduce the vibrations of the earth to corresponding electrical signals, and amplifying said transduced signals;
   b. lifting said drill pipe, drill collar and jars a selected distance, and suddenly releasing the drill pipe, so that it falls in the borehole until the drill bit strikes the bottom of the well bore, whereby the impact of the drill bit on the bottom of the well bore will generate a first elastic wave in the earth, and the impact of the pipe on the jars will generate a second elastic wave in the earth;
   c. determining the time of release of said drill pipe;
   d. recording as a function of time said amplified transduced signals and determining the times of arrival of said first and second elastic waves at said sensors; and
   e. from the known time of release of said drill pipe and the known length of drill pipe and the times of arrival of said first and second elastic waves at said sensors, determining the position of said bottom of the borehole.

9. The method as in claim 8 including the additional step of filtering with different filters said amplified transduced signals, whereby the times of arrival of said first and second elastic waves at said sensors is more precisely determined.

10. The method as in claim 2 including the additional step of determining from the known times of generation of said first and second elastic waves and the known distance between said jars and said bit, and the known times of arrival of said elastic waves at said sensors the average elastic wave velocity in the earth between said jars and said bit.

11. The method of determining the position in the earth of the bottom of a borehole, during rotary drilling of said borehole, including a known length of drill pipe, at least one drill collar, jars and bit, comprising:
   a. placing a plurality of sensors in the earth in a known geometric pattern above the expected position of the bottom of the borehole, said sensors adapted to detect and transduce the vibrations of the earth to corresponding electrical signals, and amplifying said transduced signals;
   b. lifting said drill pipe at the surface a selected distance, such that with the stretch in the drill pipe, the bottom end of the drill pipe is lifted less than a range of extension of said jars, whereby said drill collar and said bit are not lifted off bottom, and suddenly releasing the drill pipe, so that it falls in the borehole until the bottom of the drill pipe strikes the top of the drill collar with an impulsive force, thus closing said jars, whereby the closing of the jars, will generate an elastic wave in the earth;
   c. determining the time of release of said drill pipe;
   d. recording as a function of time said amplified transduced signals and determining the times of arrival of said elastic wave at said sensors; and
   e. from the known time of release of said drill pipe and the known length of drill pipe and the times of arrival of said elastic wave at said sensors, determining the position of the top of the drill collar in the earth.

12. The method as in claim 11 in which the impulsive force on the top of said drill collar will travel down said drill collar, through said bit and will generate a second elastic wave in the earth, and including the additional step of;
   knowing the length of said drill collar and bit, and the time of initiation of said elastic wave, determining the time of initiation of said second elastic wave.

13. The method of determining the position in the earth of the bottom of a borehole, during rotary drilling of said borehole, including a known length of drill pipe, at least one drill collar, jars and bit, comprising;
   a. placing a plurality of sensors in the earth in a known geometric pattern above the expected position of the bottom of the borehole, said sensors adapted to detect and transduce the vibrations of the earth to corresponding electrical signals, and amplifying said transduced signals;
   b. rapidly lifting said drill pipe until the drill bit is lifted off the bottom of the well bore, whereby the release of pressure on the bottom of the well bore by said bit will cause an expansion elastic wave to be generated in the earth;
   c. determining the time of liftoff of said drill bit;
   d. recording as a function of time said amplified transduced signals and determining the times of arrival of said expansion elastic wave of said sensors; and
   e. from the known time of liftoff of said drill bit and the times of arrival of said expansion elastic wave at said sensors, determining the position of said bottom of the borehole.

14. The method as in claim 13 including the additional steps of:
   a. placing an appropriate sensor on said drill pipe at the surface; and
   b. recording the expansion elastic wave generated in the bit by the liftoff of the bit, as it travels up the drill pipe to the surface sensor.

15. The method as in claim 1 including the additional step of:
   a. placing an appropriate sensor on said drill pipe at the surface; and
   b. recording the compressional wave generated in the bit by the impact of the bit on bottom.

16. The method as in claim 1 in which the borehole and drill pipe are filled with liquid, and including the additional step of:
   a. placing an appropriate sensor in operative relation to the liquid in the drill pipe at the surface; and
   b. recording the compressional wave generated in the liquid at the bit by the impact of the bit on bottom.

17. The method as in claim 1 in which the borehole and drill pipe are filled with liquid, and including the additional step of;
   a. placing an appropriate sensor in operation relation to the liquid in an annulus of the borehole at the surface; and
   b. recording the compressional wave generated in the liquid at the liquid at the bit by the impact of the bit on bottom.

18. The method as in claim 8 including the additional step of:
   a. placing an appropriate sensor on said drill pipe at the surface; and
   b. recording the compressional wave in the pipe initiated by the impulsive closing of the jars.

19. The method of determining the position in the earth of the bottom of a borehole, during rotary drilling of said borehole, including a known length of drill pipe, at least one drill collar, jars and a bit comprising:
   a. placing a plurality of sensors in the earth in a known geometric pattern above the expected position of the bottom of the borehole, said sensors adapted to detect and transduce the vibrations of the earth to corresponding electrical signals, and amplifying said transduced signals;
   b. from a position of the drill pipe in which said bit is on the bottom of the well bore and the jars are compressed, rapidly lifting said drill pipe so that the jars become extended, creating a first compressional wave, and lifting further until the bit is lifted off bottom, whereby a release of pressure on the bottom of the well bore by said bit will cause an expansion elastic wave to be generated in the earth;
   c. determining the time of lift of said drill pipe;
   d. recording as a function of time said amplified transduced signals and determining the times of arrival of said first compressional wave and said expansion elastic wave at said sensors; nd
   e. from the known time of lift of said drill pipe and the known times of arrival of said compressional wave and said expansion elastic wave at said sensors, determining th position of said bottom of the borehole.

* * * * *